(12) United States Patent
Wang et al.

(10) Patent No.: US 11,565,953 B2
(45) Date of Patent: Jan. 31, 2023

(54) FLEXIBLE ELECTROCATALYTIC MEMBRANE FOR REMOVING NITRATE FROM WATER, PREPARATION METHOD AND USE THEREOF

(71) Applicants: Tongji University, Shanghai (CN); Tianjin Polytechnic University, Tianjin (CN)

(72) Inventors: Zhiwei Wang, Shanghai (CN); Yang Li, Shanghai (CN); Hongwei Zhang, Tianjin (CN); Jie Wang, Tianjin (CN); Xueye Wang, Shanghai (CN)

(73) Assignees: TONGJI UNIVERSITY, Shanghai (CN); TIANJIN POLYTECHNIC UNIVERSITY, Tianjin (CN)

( * ) Notice: Subject to any disclaimer, the term of this patent is extended or adjusted under 35 U.S.C. 154(b) by 332 days.

(21) Appl. No.: 15/930,454

(22) Filed: May 13, 2020

(65) Prior Publication Data
US 2021/0198123 A1 Jul. 1, 2021

(30) Foreign Application Priority Data

Dec. 25, 2019 (CN) .......................... 201911351930.0

(51) Int. Cl.
C02F 1/467 (2006.01)
C02F 1/461 (2006.01)
C02F 101/16 (2006.01)

(52) U.S. Cl.
CPC ........ C02F 1/4676 (2013.01); C02F 1/46109 (2013.01); C02F 2001/46133 (2013.01);
(Continued)

(58) Field of Classification Search
None
See application file for complete search history.

(56) References Cited

FOREIGN PATENT DOCUMENTS

CN 111040238 A * 4/2020 ............... C08J 9/28

OTHER PUBLICATIONS

Li et al. (J. Mater. Chem. A, 2016, 4, 17324-17332) (Year: 2016).*
(Continued)

*Primary Examiner* — Wojciech Haske
(74) *Attorney, Agent, or Firm* — Bayramoglu Law Offices LLC

(57) ABSTRACT

A flexible electrocatalytic membrane for removing nitrate from water, a preparation method and use thereof are provided. The method of the present invention includes dropwise adding an aramid fiber solution into deionized water to prepare an aramid nanofiber sol, then reacting an ethanol solution containing 3,4-ethylenedioxythiophene and ferric nitrate with the aramid nanofiber sol to prepare a conductive aramid nanofiber sol, and finally dropwise adding MXene nanosheets ultrasonically pretreated by a tetramethylammonium hydroxide solution into the conductive aramid nanofiber sol to prepare the flexible electrocatalytic membrane. The prepared flexible electrocatalytic membrane possesses good mechanical strength and flexibility, and can not only effectively remove nitrate but also avoid failure of electrocatalytic materials due to surface fouling in the process of electrocatalytic reduction of nitrate, and thus has a long service life.

12 Claims, 3 Drawing Sheets

(52) U.S. Cl.
CPC .............. *C02F 2101/163* (2013.01); *C02F 2201/46115* (2013.01)

(56) References Cited

OTHER PUBLICATIONS

Muramatsu et al. (Chem. Commun., 2014, 50, 11840) (Year: 2014).*
Tseghi et al. (Sensors 2020, 20, 1881; doi:10.3390/s20071881) (Year: 2020).*
Ding et al. CN 111040238 A, machine translation (Year: 2019).*

* cited by examiner

FLEXIBLE ELECTROCATALYTIC MEMBRANE FOR REMOVING NITRATE FROM WATER, PREPARATION METHOD AND USE THEREOF

CROSS REFERENCE TO THE RELATED APPLICATIONS

This application is based upon and claims priority to Chinese Patent Application No. 201911351930.0, filed on Dec. 25, 2019, the entire contents of which are incorporated herein by reference.

TECHNICAL FIELD

The present invention particularly relates to a flexible electrocatalytic membrane for removing nitrate from water, a preparation method and use thereof, and belongs to the technical field of electrocatalytic membranes.

BACKGROUND

Aqueous nitrate at elevated concentrations in groundwater and the effluent of municipal sewage plants has become a great challenge for water and sewage treatment. The traditional microbial denitrification process may be failed to maintain a steady removal efficiency for nitrate, due to an uncontrollable operation for adding carbon source. Moreover, the techniques of ion exchange, electrodialysis and reverse osmosis could not avoid the production of secondary pollution (i.e. the concentrate). Therefore, seeking an efficient method for removing nitrate currently is a hotspot in research and development.

Nitrate can be reduced to nitrogen spontaneously under a constant potential through electrocatalytic reduction method. Compared with the above-mentioned treatment techniques, the electrocatalytic reduction method possesses advantages such as the ease of operation, low energy consumption and high removal efficiency. However, there are particles and colloidal substances in the actual sewage, and these substances are rich in metal ions, organic matters and microorganisms. During the long-term operation of the electrocatalytic material, the colloidal substances (containing metal ions, organic matters and microorganisms) in the water would easily adhere to the surface of the electrocatalytic material, resulting in malfunction of the electrocatalytic material. Therefore, it is currently an urgent issue in water treatment by the electrocatalytic reduction method, to develop an electrocatalytic material which can not only solve the problem that the electrocatalytic material fails due to surface contamination in the process of electrocatalytic reduction of nitrate, but also efficiently remove nitrate.

SUMMARY

In light of the problems in the prior art, the present invention provides a flexible electrocatalytic membrane for removing nitrate from water, a preparation method and an application thereof. The method of the present invention is simple in operation. The flexible electrocatalytic membrane prepared with this method can not only efficiently remove nitrate through electrocatalytic reduction, but also retard the failure of the electrocatalytic material due to surface contamination, thus having a long service life.

In order to achieve the above objective, technical solutions of the present invention are as follows.

A method of preparing a flexible electrocatalytic membrane for removing nitrate from water includes the following steps:

(1) Preparation of an Aramid Nanofiber Sol:

fracturing an aramid textile yarn and adding the aramid textile yarn into dimethyl sulfoxide for stirring, followed by adding potassium hydroxide, and continuously stirring until the aramid fiber is completely dissolved to obtain an aramid fiber solution; dropwise adding the aramid fiber solution obtained into deionized water, stirring for a period of time and then centrifuging to obtain a supernatant, i.e. the aramid nanofiber sol;

(2) Preparation of a Conductive Aramid Nanofiber Sol:

dissolving 3,4-ethylenedioxythiophene and ferric nitrate in ethanol, and stirring uniformly to obtain a mixed solution; adding the mixed solution obtained into the aramid nanofiber sol prepared in step (1), and reacting for 1 hour to 3 hours at 40° C. to 50° C., to obtain the conductive aramid nanofiber sol; and (3) Preparation of the Flexible Electrocatalytic Membrane:

adding MXene nanosheets into a tetramethyl ammonium hydroxide solution and performing an ultrasonic treatment in an ice bath for 1 hour to 2 hours, and then dropwise adding the ultrasonically treated MXene nanosheet solution into the conductive aramid nanofiber sol prepared in step (2), stirring for 1 hour to 2 hours and then carrying out a suction filtration to obtain the flexible electrocatalytic membrane.

Preferably, the aramid, dimethyl sulfoxide, and deionized water in step (1) are used in an amount ratio of 1 g:(300-800) mL:(2000-3000) mL.

Preferably, the mass ratio of the aramid to the potassium hydroxide in step (1) is 1:(0.8-2).

Preferably, the mass ratio of the 3,4-ethylenedioxythiophene to the ferric nitrate in step (2) is 1:(1.5-3), and the volume ratio of the mixed solution to the aramid nanofiber sol is 1:(3-5).

Preferably, the MXene nanosheets and the conductive aramid nanofiber sol in step (3) are used in an amount ratio of 1 g:(0.5-2) L.

A flexible electrocatalytic membrane prepared with any of the above methods.

A use of the flexible electrocatalytic membrane prepared above in the electrocatalytic reduction of nitrate, including the steps of: placing the flexible electrocatalytic membrane as a cathode in a first container and connecting the cathode to a negative electrode of a direct current power supply, and placing a graphite rod as an anode in a second container and connecting the anode to a positive electrode of the direct current power supply, wherein a water inlet and a water outlet are provided respectively at the top and the bottom of the first container, the first container communicates with the second container through a communicating pipe where a proton exchange membrane is provided, and the first container and the second container initially contain nitrate solutions at the same concentration.

Preferably, the nitrate solution has a pH value of 6-9 and a concentration of 1-10 mg/L, the cathode voltage of the direct current power supply is 0.6-1.0 V, and the water permeability of the flexible electrocatalytic membrane is 50-150 L/(m² h bar).

According to the above description, the present invention possesses the following advantages.

1. In the present invention, firstly an aramid fiber solution is added dropwise into deionized water to prepare an aramid nanofiber sol; secondly, an ethanol solution containing 3,4-ethylenedioxythiophene and ferric nitrate reacts with the aramid nanofiber sol to prepare a conductive aramid nanofiber sol; finally MXene nanosheets ultrasonically pretreated by a tetramethylammonium hydroxide solution are added dropwise into the conductive aramid nanofiber sol to prepare the flexible electrocatalytic membrane. The preparation method of the present invention is simple and the flexible electrocatalytic membrane prepared possesses good mechanical strength and flexibility, which has a significant effect on the electrocatalytic reduction of nitrate. The flexible electrocatalytic membrane is applicable to rapid treatment of water and sewage with excessive nitrate.

2. The reductive active sites of the existing common electrocatalytic materials are all limited to the surface of the materials. When the particles and colloidal substances existing in the actual sewage adhere to the surface of the electrocatalytic materials, the electrocatalytic materials are prone to malfunction (as shown in FIG. 4A-FIG. 4C). Compared with the existing common electrocatalytic materials, the electrocatalytic membrane prepared in the present invention has excellent rejection performance toward foulants in the sewage and is rich in well-developed interlayer nano-water channels. The reductive active sites thereof are not only distributed on the surface of the membrane but also in the multilayer water channels of the membrane, and even if the foulants rejected in the water adhere to the surface of the electrocatalytic membrane, they would not cause the failure of the electrocatalytic membrane (as shown in FIG. 4D), which can greatly prolong the service life of the electrocatalytic membrane.

DETAILED DESCRIPTION OF THE EMBODIMENTS

Features of the present invention will be further illustrated below through the embodiments which however do not pose any limitations to the claims of the invention.

Embodiment 1

A method of preparing a flexible electrocatalytic membrane for removing nitrate from water, including the following steps.

(1) Preparation of an Aramid Nanofiber Sol 1.0 g of an aramid textile yarn was fractured, then added into 300 mL of dimethyl sulfoxide and stirred, followed by adding 0.8 g of potassium hydroxide, and the mixture was further stirred until the aramid fiber was completely dissolved to obtain an aramid fiber solution, the aramid fiber solution obtained was added dropwise into 2000 mL of deionized water, stirred for 2 hours and then centrifugated at a rotation speed of 2500 rpm, and the supernatant was collected as the aramid nanofiber sol.

(2) Preparation of a Conductive Aramid Nanofiber Sol 0.10 g of 3,4-ethylenedioxythiophene and 0.15 g of ferric nitrate were dissolved into 50 mL of ethanol, and stirred for 3 hours to obtain a mixed solution; the mixed solution obtained was added into 150 mL of the aramid nanofiber sol prepared in step (1), and reacted for 3 hours at 40° C., to obtain the conductive aramid nanofiber sol.

Figure 1:
FIG. 1 is a real product of the flexible electrocatalytic membrane prepared in Embodiment 1.
Figure 2:
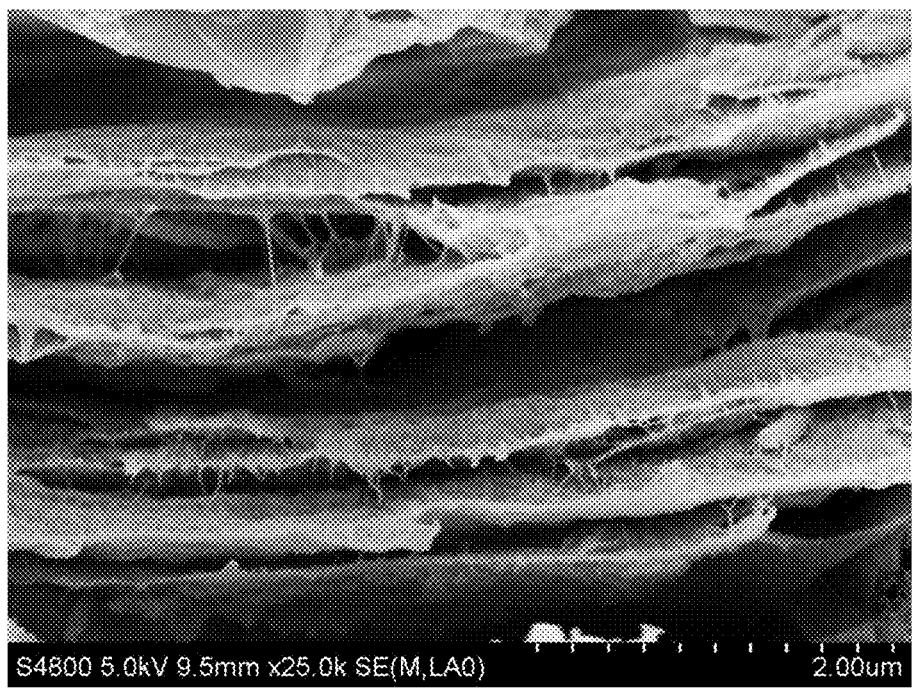
FIG. 2 is a scanning electron microscope image of a cross-section of the flexible electrocatalytic membrane prepared in Embodiment 1.

(3) Preparation of the Flexible Electrocatalytic Membrane 1.0 g of MXene nanosheets (which are commercially available from Taizhou Beike Nano Materials Co., Ltd., and have a multilayer structure of more than two layers) was added into a 0.5 g/L tetramethyl ammonium hydroxide solution, and ultrasonically treated in an ice bath for 1.5 hours, and then the ultrasonically treated MXene nanosheet solution was added dropwise into 500 mL of the conductive aramid nanofiber sol prepared in step (2), stirred for 1.5 hours and then subjected to suction filtration, to obtain the flexible electrocatalytic membrane (FIG. 1 shows a real product of the flexible electrocatalytic membrane, and FIG. 2 is a scanning electron microscope image of a cross-section of the flexible electrocatalytic membrane). The conductivity of the flexible electrocatalytic membrane was 1340 S/cm.

Figure 3:
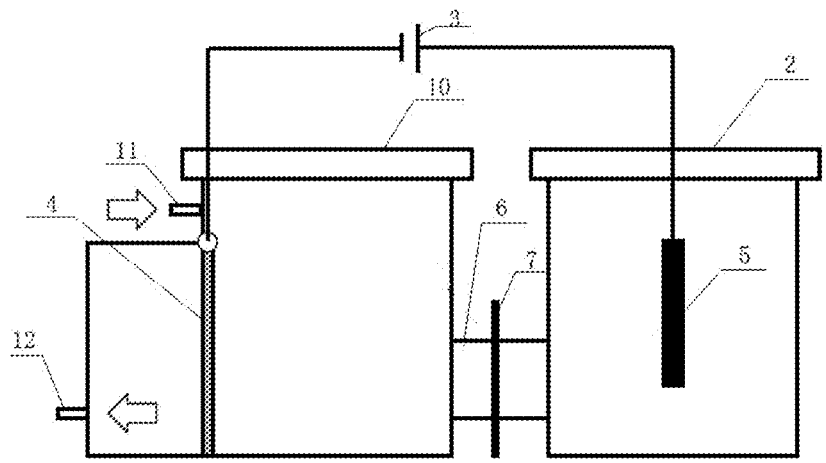
FIG. 3 is a structural diagram of a membrane catalytic system when the electrocatalytic membrane of Embodiment 1 is used.
Figure 4A:
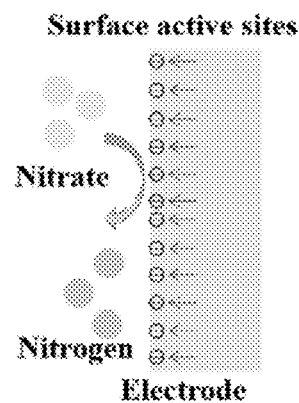
FIG. 4A-FIG. 4C show the distributions of reductive active sites in the common electrocatalytic materials after foulants adhere to the surface.
Figure 4B:
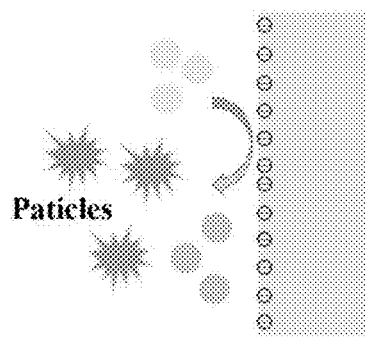
Figure 4C:
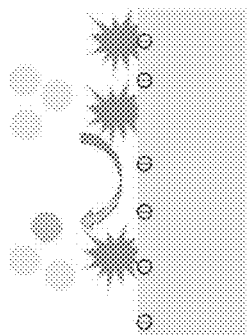
Figure 4D:
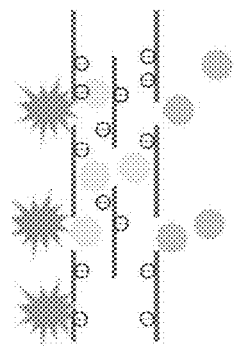
FIG. 4D shows the distributions of reductive active sites in the flexible electrocatalytic membrane prepared by the present invention after foulants adhere to the surface.

As shown in FIG. 3, the membrane catalytic system using the flexible electrocatalytic membrane includes the first container 10, the second container 2, the direct current power supply 3, the flexible electrocatalytic membrane 4 and the graphite rod 5, wherein the water inlet 11 and the water outlet 12 are provided respectively at the top and the bottom of the first container, both the first container 10 and the second container 2 initially contain nitrate solutions at the same concentration, and the first container 10 communicates with the second container 2 through the communicating pipe 6 on which the proton exchange membrane 7 is provided, to prevent oxidizing substances produced in the solution of the second container from entering the first container through the communicating pipe during the electrolysis process, the flexible electrocatalytic film 4 is placed as the cathode in the first container 10 and the cathode is connected to the negative electrode of the direct current power supply 3, the graphite rod 5 is placed as the anode in the second container 2 and the anode is connected to the positive electrode of the direct current power supply 3.

The above membrane system using the flexible electrocatalytic membrane of the present embodiment was operated under the condition where the cathode voltage of the direct current power supply was 0.8 V and the water permeability of the flexible electrocatalytic membrane was 100 L/(m² h bar). The selective reduction of the nitrate solution with a neutral pH value and a concentration of 10 mg/L (calculated on N) to nitrogen by the flexible electrocatalytic membrane within 1 hour could reach 76.7%.

Embodiment 2

A method of preparing a flexible electrocatalytic membrane for removing nitrate from water, including the following steps.

(1) Preparation of an Aramid Nanofiber Sol 1.0 g of an aramid textile yarn was fractured, then added into 500 mL of dimethyl sulfoxide and stirred, followed by adding 1.5 g of potassium hydroxide, and the mixture was further stirred until the aramid fiber was completely dissolved to obtain an aramid fiber solution, the aramid fiber solution obtained was added dropwise into 2500 mL of deionized water, stirred for 2 hours and then centrifugated at a rotation speed of 2500 rpm, and the supernatant was collected as the aramid nanofiber sol.

(2) Preparation of a Conductive Aramid Nanofiber Sol 0.10 g of 3,4-ethylenedioxythiophene and 0.2 g of ferric nitrate were dissolved into 100 mL of ethanol, and stirred for 3 hours to obtain a mixed solution; the mixed solution obtained was added into 400 mL of the aramid nanofiber sol prepared in step (1), and reacted for 2 hours at 45° C., to obtain the conductive aramid nanofiber sol.

(3) Preparation of the Flexible Electrocatalytic Membrane 1.0 g of MXene nanosheets (which are commercially available from Taizhou Beike Nano Materials Co., Ltd., and have a multilayer structure of more than two layers) was added into a 0.5 g/L tetramethyl ammonium hydroxide solution, and ultrasonically treated in an ice bath for 1.5 hours, and then the ultrasonically treated MXene nanosheet solution was added dropwise into 1 L of the conductive aramid nanofiber sol prepared in step (2), stirred for 1.5 hours and then subjected to suction filtration, to obtain the flexible electrocatalytic membrane. The conductivity of the flexible electrocatalytic membrane was 890 S/cm.

The identical membrane catalytic system as that in Embodiment 1, which uses the flexible electrocatalytic membrane of the present embodiment, was operated under the condition where the cathode voltage of the direct current power supply was 0.6 V and the water permeability of the flexible electrocatalytic membrane was 100 L/(m$^2$ h bar). The selective reduction of the nitrate solution with a neutral pH value and a concentration of 10 mg/L (calculated on N) to nitrogen by the flexible electrocatalytic membrane within 1 hour could reach 68.2%.

Embodiment 3

A method of preparing a flexible electrocatalytic membrane for removing nitrate from water, including the following steps.

(1) Preparation of an Aramid Nanofiber Sol 1.0 g of an aramid textile yarn was fractured, then added into 800 mL of dimethyl sulfoxide and stirred, followed by adding 2.0 g of potassium hydroxide, and the mixture was further stirred until the aramid fiber was completely dissolved to obtain an aramid fiber solution, the aramid fiber solution obtained was added dropwise into 3000 mL of deionized water, stirred for 2 hours and then centrifugated at a rotation speed of 2500 rpm, and the supernatant was collected as the aramid nanofiber sol.

(2) Preparation of a Conductive Aramid Nanofiber Sol 0.10 g of 3,4-ethylenedioxythiophene and 0.3 g of ferric nitrate were dissolved into 100 mL of ethanol, and stirred for 3 hours to obtain a mixed solution; the mixed solution obtained was added into 500 mL of the aramid nanofiber sol prepared in step (1), and reacted for 1 hour at 50° C., to obtain the conductive aramid nanofiber sol.

(3) Preparation of the Flexible Electrocatalytic Membrane 1.0 g of MXene nanosheets (which are commercially available from Taizhou Beike Nano Materials Co., Ltd., and have a multilayer structure of more than two layers) was added into a 0.5 g/L tetramethyl ammonium hydroxide solution, and ultrasonically treated in an ice bath for 1.5 hours, and then the ultrasonically treated MXene nanosheet solution was added dropwise into 2 L of the conductive aramid nanofiber sol prepared in step (2), stirred for 1.5 hours and then subjected to suction filtration, to obtain the flexible electrocatalytic membrane. The conductivity of the flexible electrocatalytic membrane was 570 S/cm.

The identical membrane catalytic system as that in Embodiment 1, which uses the flexible electrocatalytic membrane of the present embodiment, was operated under the condition where the cathode voltage of the direct current power supply was 1.0 V and the water permeability of the flexible electrocatalytic membrane was 100 L/(m$^2$ h bar). The selective reduction of the nitrate solution with a neutral pH value and a concentration of 10 mg/L (calculated on N) to nitrogen by the flexible electrocatalytic membrane within 1 hour could reach 59.4%.

It should be understood that the above specific description of the present invention is only used to explain the present invention but the present invention is not limited to the technical solutions described in the embodiments of the present invention. It should be understood by those of ordinary skill in the art that, the present invention may still be modified or equivalently replaced to achieve the same technical effect. All these modifications and equivalent replacements fall within the protection scope of the present invention, as long as the usage needs are met.

What is claimed is:

1. A method of preparing a flexible electrocatalytic membrane for removing nitrate from water, comprising the following steps:

(1) preparation of an aramid nanofiber sol:
fracturing an aramid textile yarn to obtain a fractured aramid textile yarn, adding the fractured aramid textile yarn into dimethyl sulfoxide for stirring to obtain a first solution, followed by adding potassium hydroxide into the first solution to obtain a second solution, and continuously stirring the second solution until an aramid fiber in the fractured aramid textile yarn is completely dissolved to obtain an aramid fiber solution, dropwise adding the aramid fiber solution into deionized water to obtain a third solution, stirring the third solution for a period of time and then centrifuging the third solution to obtain a supernatant comprising the aramid nanofiber sol;

(2) preparation of a conductive aramid nanofiber sol:
dissolving 3,4-ethylenedioxythiophene and ferric nitrate in ethanol for stirring uniformly to obtain a mixed solution; adding the mixed solution into the aramid nanofiber sol prepared in step (1) to obtain a fourth solution, and performing a reaction on the fourth solution for 1 hour to 3 hours at 40° C. to 50° C. to obtain the conductive aramid nanofiber sol; and (3) preparation of the flexible electrocatalytic membrane:
adding MXene nanosheets into a tetramethyl ammonium hydroxide solution to obtain a fifth solution, performing an ultrasonic treatment on the fifth solution in an ice bath for 1 hour to 2 hours to obtain an ultrasonically treated MXene nanosheet solution, and then dropwise adding the ultrasonically treated MXene nanosheet solution into the conductive aramid nanofiber sol prepared in step (2) to obtain a sixth solution, stirring the sixth solution for 1 hour to 2 hours and then carrying out a suction filtration on the sixth solution to obtain the flexible electrocatalytic membrane.

2. The method of preparing the flexible electrocatalytic membrane for removing nitrate from water of claim 1, wherein the aramid textile yarn, the dimethyl sulfoxide, and the deionized water in step (1) are used in an amount ratio of 1 g:(300-800) mL:(2000-3000) mL.

3. The method of preparing the flexible electrocatalytic membrane for removing nitrate from water of claim 1, wherein a mass ratio of the aramid textile yarn to the potassium hydroxide in step (1) is 1:(0.8-2).

4. The method of preparing the flexible electrocatalytic membrane for removing nitrate from water of claim 1, wherein in step (2), a mass ratio of the 3,4-ethylenedioxythiophene to the ferric nitrate is 1:(1.5-3), and a volume ratio of the mixed solution to the aramid nanofiber sol is 1:(3-5).

5. The method of preparing the flexible electrocatalytic membrane for removing nitrate from water of claim 1, wherein the MXene nanosheets and the conductive aramid nanofiber sol in step (3) are used in an amount ratio of 1 g:(0.5-2) L.

6. A flexible electrocatalytic membrane prepared using the method of claim 1.

7. A method of using the flexible electrocatalytic membrane of claim 6 in an electrocatalytic reduction of nitrate, comprising the steps of:
placing the flexible electrocatalytic membrane as a cathode in a first container and connecting the cathode to a negative electrode of a direct current power supply, and
placing a graphite rod as an anode in a second container and connecting the anode to a positive electrode of the direct current power supply;
wherein
a water inlet is provided at a top of the first container, and a water outlet is provided at a bottom of the first container;
the first container communicates with the second container through a communicating pipe, and a proton exchange membrane is provided on the communicating pipe; and
the first container contains a first nitrate solution, the second container contain a second nitrate solution, and an initial concentration of the first nitrate solution is equal to an initial concentration of the second nitrate solution.

8. The method of claim 7, wherein a pH value of each of the first nitrate solution and the second nitrate solution is 6-9, the initial concentration of each of the first nitrate solution and the second nitrate solution is 1-10 mg/L, a cathode voltage of the direct current power supply is 0.6 V to 1.0 V, and a water permeability of the flexible electrocatalytic membrane is 50-150 $L/(m^2 \cdot h \cdot bar)$.

9. The flexible electrocatalytic membrane of claim 6, wherein the aramid textile yarn, the dimethyl sulfoxide, and the deionized water in step (1) are used in an amount ratio of 1 g:(300-800) mL:(2000-3000) mL.

10. The flexible electrocatalytic membrane of claim 6, wherein a mass ratio of the aramid textile yarn to the potassium hydroxide in step (1) is 1:(0.8-2).

11. The flexible electrocatalytic membrane of claim 6, wherein in step (2), a mass ratio of the 3,4-ethylenedioxythiophene to the ferric nitrate is 1:(1.5-3), and a volume ratio of the mixed solution to the aramid nanofiber sol is 1:(3-5).

12. The flexible electrocatalytic membrane of claim 6, wherein the MXene nanosheets and the conductive aramid nanofiber sol in step (3) are used in an amount ratio of 1 g:(0.5-2) L.

* * * * *